United States Patent
Kim et al.

(10) Patent No.: US 9,262,916 B2
(45) Date of Patent: Feb. 16, 2016

(54) SERVER FOR PROVIDING TRAFFIC IMAGE TO USER DEVICE, AND THE USER DEVICE

(75) Inventors: Seok-Woo Kim, Seongnam-si (KR); Se-Hoon Kim, Seoul (KR); Eui-Jik Kim, Suwon-si (KR); Jin-Soo Park, Seongnam-si (KR); Han-Wook Jung, Seoul (KR); Sung-Phil Heo, Seoul (KR)

(73) Assignee: KT Corporation, Seongnam (KR)

( * ) Notice: Subject to any disclaimer, the term of this patent is extended or adjusted under 35 U.S.C. 154(b) by 615 days.

(21) Appl. No.: 13/396,276

(22) Filed: Feb. 14, 2012

(65) Prior Publication Data
US 2012/0221677 A1 Aug. 30, 2012

(30) Foreign Application Priority Data

Feb. 14, 2011 (KR) .................. 10-2011-0012729

(51) Int. Cl.
*G08G 1/04* (2006.01)
*G01S 5/00* (2006.01)
*G08G 1/0967* (2006.01)
*G01C 21/36* (2006.01)

(52) U.S. Cl.
CPC .............. *G08G 1/04* (2013.01); *G01C 21/3694* (2013.01); *G01S 5/0027* (2013.01); *G08G 1/096791* (2013.01)

(58) Field of Classification Search
CPC ..... G08G 1/20; G08G 1/0112; G01C 21/3647
USPC .................................. 709/217; 701/117–119
See application file for complete search history.

(56) References Cited

U.S. PATENT DOCUMENTS

| | | | |
|---|---|---|---|
| 6,812,851 B1* | 11/2004 | Dukach et al. ............. 340/815.4 |
| 2003/0212567 A1* | 11/2003 | Shintani et al. .................... 705/1 |
| 2005/0278113 A1* | 12/2005 | Maruyama et al. ........... 701/208 |
| 2007/0005234 A1* | 1/2007 | Kashiwase et al. ........... 701/200 |
| 2008/0024323 A1* | 1/2008 | Kadaba ......................... 340/905 |
| 2008/0109162 A1* | 5/2008 | Chen et al. ..................... 701/210 |
| 2010/0063729 A1* | 3/2010 | Goto et al. .................... 701/209 |
| 2010/0094532 A1* | 4/2010 | Vorona .......................... 701/119 |
| 2010/0121571 A1* | 5/2010 | Cabral et al. .................. 701/209 |
| 2010/0217515 A1* | 8/2010 | Arai et al. ...................... 701/201 |
| 2012/0163255 A1* | 6/2012 | Choi ............................. 370/310 |
| 2013/0342368 A1* | 12/2013 | Nathanson ............. G07C 5/008 340/903 |

FOREIGN PATENT DOCUMENTS

KR 10-2009-0102039 A 9/2009

* cited by examiner

*Primary Examiner* — Brian J Gillis
*Assistant Examiner* — Steve Lin
(74) *Attorney, Agent, or Firm* — Sughrue Mion, PLLC

(57) ABSTRACT

A server for providing a traffic image to a user device includes a location information receiving unit which receives information relating to a respective location of each of a plurality of vehicles, a location management unit which receives information relating to a particular area from a user device, and which detects at least one vehicle located within the particular area based on the location information, an information sending unit which sends information relating to the at least one detected vehicle to the user device, an image requesting unit which receives information relating to a vehicle selected from among the at least one detected vehicle from the user device, and which requests, from a device installed in the selected vehicle, transmission of a traffic image of the selected vehicle, and an image providing unit which receives the image and which provides the traffic image to the user device.

19 Claims, 14 Drawing Sheets

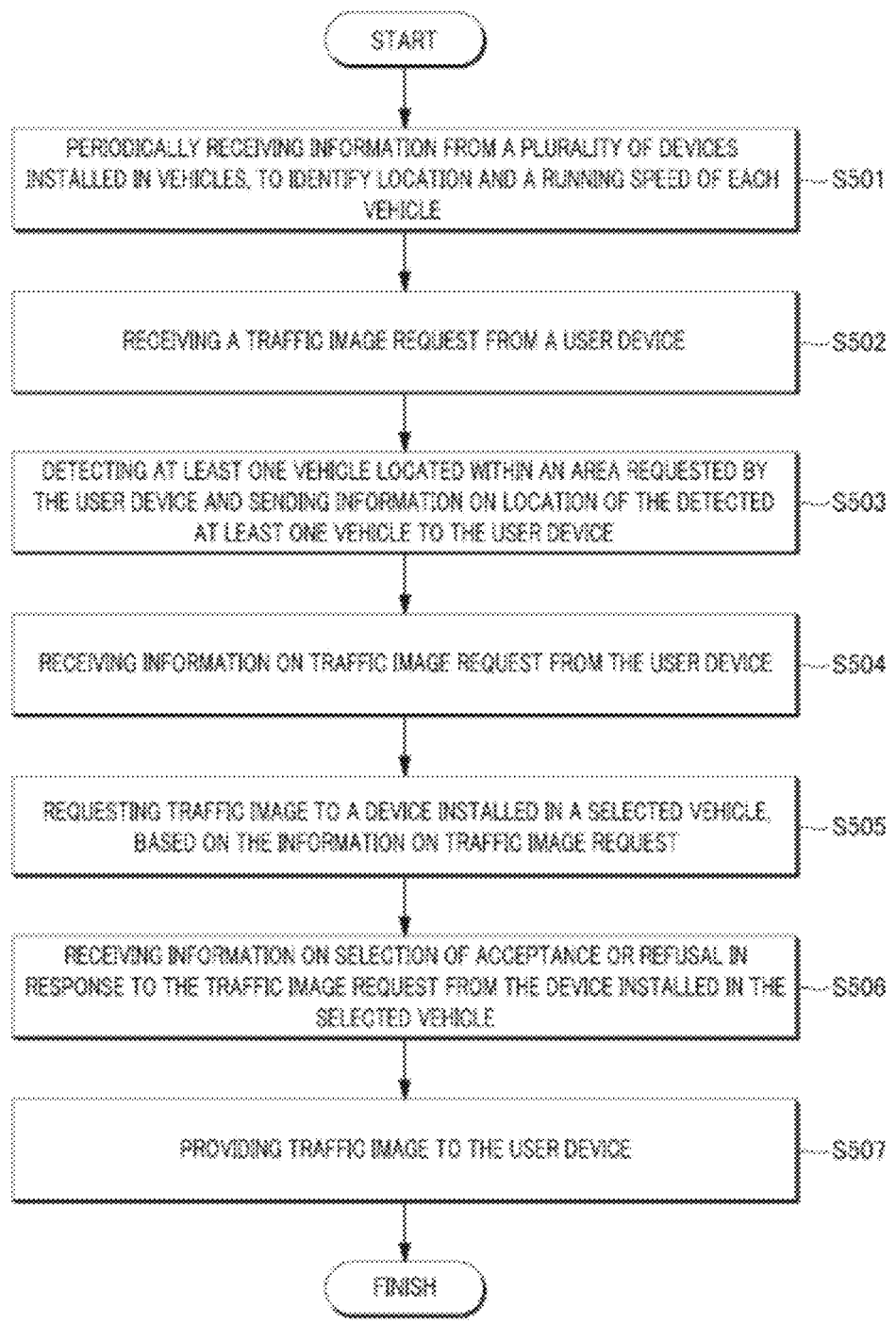

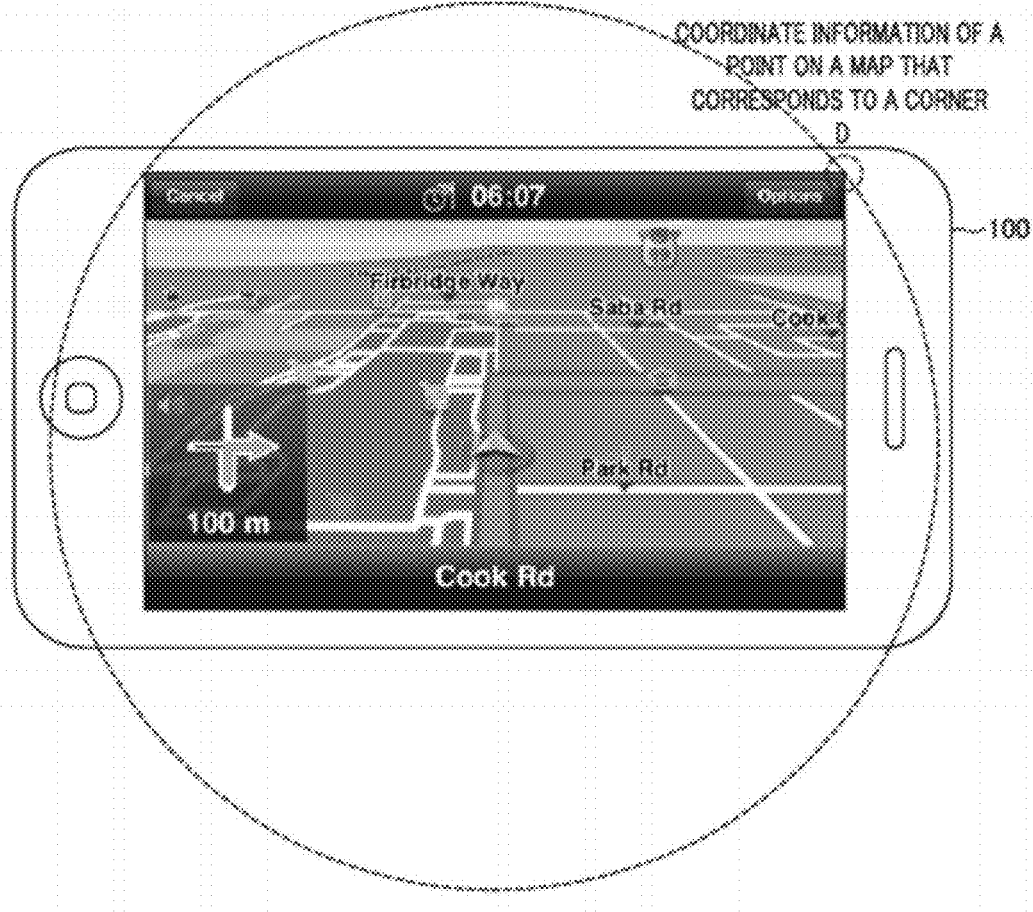

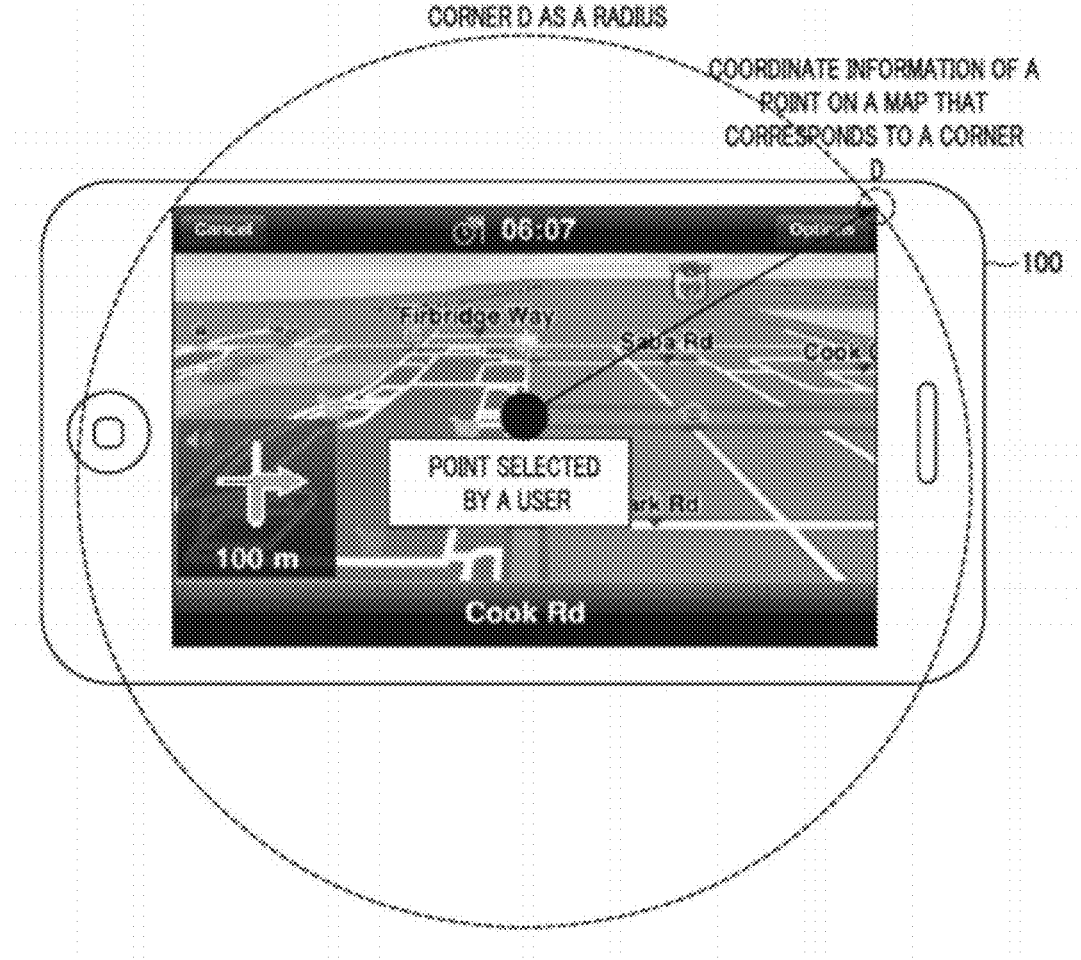

SERVER FOR PROVIDING TRAFFIC IMAGE TO USER DEVICE, AND THE USER DEVICE

CROSS-REFERENCE TO RELATED APPLICATION

This application claims priority from Korean Patent Application No. 10-2011-0012729, filed on Feb. 14, 2011 in the Korean Intellectual Property Office, the disclosure of which is incorporated herein by reference in its entirety.

BACKGROUND

1. Field

The present disclosure relates to a server for providing a traffic image to a user device, and more particularly, to a server for providing a traffic image to a user device by using location information and the user device.

2. Description of the Related Art

With respect to conventional art which relates to identifying a traffic state of a particular road from a remote point, there is a scheme for collecting data sensed by a traffic sensing apparatus of a freeway traffic management system (FTMS), such as a loop type vehicle detector, which is provided on a road to detect traffic states, a video type vehicle sensor, which is configured to identify traffic states on a road through the use of video photographing, a closed circuit television (CCTV), and an emergency call.

The FTMS is a freeway intelligent traffic system (ITS) constructed by the Korea Highway Corporation to provide users of a freeway with exact road information and to manage traffic conditions.

However, in order to implement a system for measuring a speed of a vehicle by using the loop type detection system, installation of a loop coil detector typically requires earthworks and/or other types of construction, thereby causing delay and/or inconvenience in transportation during the earthworks and/or construction.

Further, in order to collect information, it is typically necessary to install a separate private cable or to lease a dedicated line.

With respect to a more advanced scheme than the above-described conventional art, there is a scheme for identifying road traffic states by analyzing moving images obtained by using a CCTV camera.

In the aforementioned scheme for collecting traffic information by using a CCTV camera, the information is generally transferred through a self-network. Thus, high costs for line installation and line management are typically required.

In the above-described scheme for sensing a speed of a vehicle by using the traffic sensing system, it is not possible to identify an exact speed of a vehicle, i.e., traffic volume information, at a point where no speed sensor exists. In order to sense the traffic volume, a large number of speed sensors should be provided on each road. As a result, the number of communication lines increases, and the resultant burden of installation costs and lease fees for communication increases.

The aforementioned scheme for using a CCTV camera is limited, because traffic information can be identified only at a point where a CCTV camera is provided.

Korean Patent No. 957,605, entitled "System for Providing Road Traffic Images," describes detecting peripherally located vehicles based on location of a user and purchasing moving images captured in any one of the detected vehicles.

However, this technology relates to enabling a service server to send a traffic image purchase request to a multiple number of vehicles which are located in relatively close proximity to the user and an intermediate communication between the user and a vehicle which first responds to the request.

Accordingly, in the above-described system, it is not possible to obtain traffic images from a vehicle which is located at a point selected by the user. Further, because a certain amount of costs are paid for provided traffic images, the user may experience monetary damages resulting from receiving unnecessary traffic images.

SUMMARY

In order to address the above-described conventional problems, an exemplary embodiment provides an apparatus for detecting a peripherally located vehicle based on a location of a user or a particular point on a map which point is selected by a user, so as to be provided with traffic images captured by a device installed in the detected vehicle.

An exemplary embodiment also provides an apparatus which enables a user to directly select a vehicle, from which traffic images are provided.

According to an aspect of an exemplary embodiment, a server for providing a traffic image is provided. The server includes a location information receiving unit which periodically receives, from each of a plurality of devices which are installed in respective vehicles, information relating to a respective location of each of the vehicles, a vehicle location management unit which receives a traffic image request including information relating to a particular area from a first user device, and which detects at least one vehicle located within the particular area based on the location information, a vehicle information sending unit which sends information relating to the detected at least one vehicle to the first user device, a traffic image requesting unit which receives information relating to a vehicle selected from among the detected at least one vehicle from the first user device, and which requests, from a device installed in the selected vehicle, transmission of a traffic image of the selected vehicle; and a traffic image providing unit which receives the transmitted traffic image, and which provides the traffic image to the first user device.

According to an aspect of another exemplary embodiment, a user device for displaying a traffic image is provided. The user device includes a location information sending unit which sends information relating to a particular area which is selected by a user to a server, a vehicle information display unit which receives information relating to at least one vehicle located within the particular area from the server, and which displays a location of the at least one vehicle on a map, a traffic image requesting unit which receives information relating to a selected vehicle from among the at least one vehicle, and which requests, from the server, transmission of a traffic image captured by a device installed in the selected vehicle, and a display unit which receives the traffic image from the server, and which displays the received traffic image on a screen.

According to the above-described aspects of the exemplary embodiments, it is possible to detect peripherally located vehicles based on a location of a user or a particular point on a map which is selected by a user.

A user directly may select one of the detected vehicles to request traffic images, such that traffic states relating to the corresponding point can be identified and/or described in detail.

A certain amount of costs may be paid to the driver of a vehicle providing traffic images, such that the driver may obtain additional income. Furthermore, providing and using traffic images can be promoted, for example, via advertisement and/or public service announcement.

In case of occurrence of an emergency circumstance, such as, for example, a traffic accident or a vehicle violating the traffic rules, traffic images captured from a peripheral vehicle may be provided to a related organization such that the captured traffic images may be used for news reporting or evidence.

BRIEF DESCRIPTION OF THE DRAWINGS

Non-limiting and non-exhaustive exemplary embodiments will be described in conjunction with the accompanying drawings. Understanding that these drawings depict only several exemplary embodiments in accordance with the disclosure and are, therefore, not intended to limit its scope, the disclosure will be described with specificity and detail through use of the accompanying drawings, in which:

FIG. 5 is a flow chart which illustrates a process for providing traffic images, according to an exemplary embodiment;

FIG. 6B is a view which illustrates a distance from a location of a user device to a point on a map of the user device that corresponds to a corner of a screen, according to an exemplary embodiment;

FIG. 6C is a view which illustrates a distance from a user-selected point to a point on a map of a user device that corresponds to a corner of a screen, according to another exemplary embodiment;

DETAILED DESCRIPTION OF EXEMPLARY EMBODIMENTS

Figure 1:
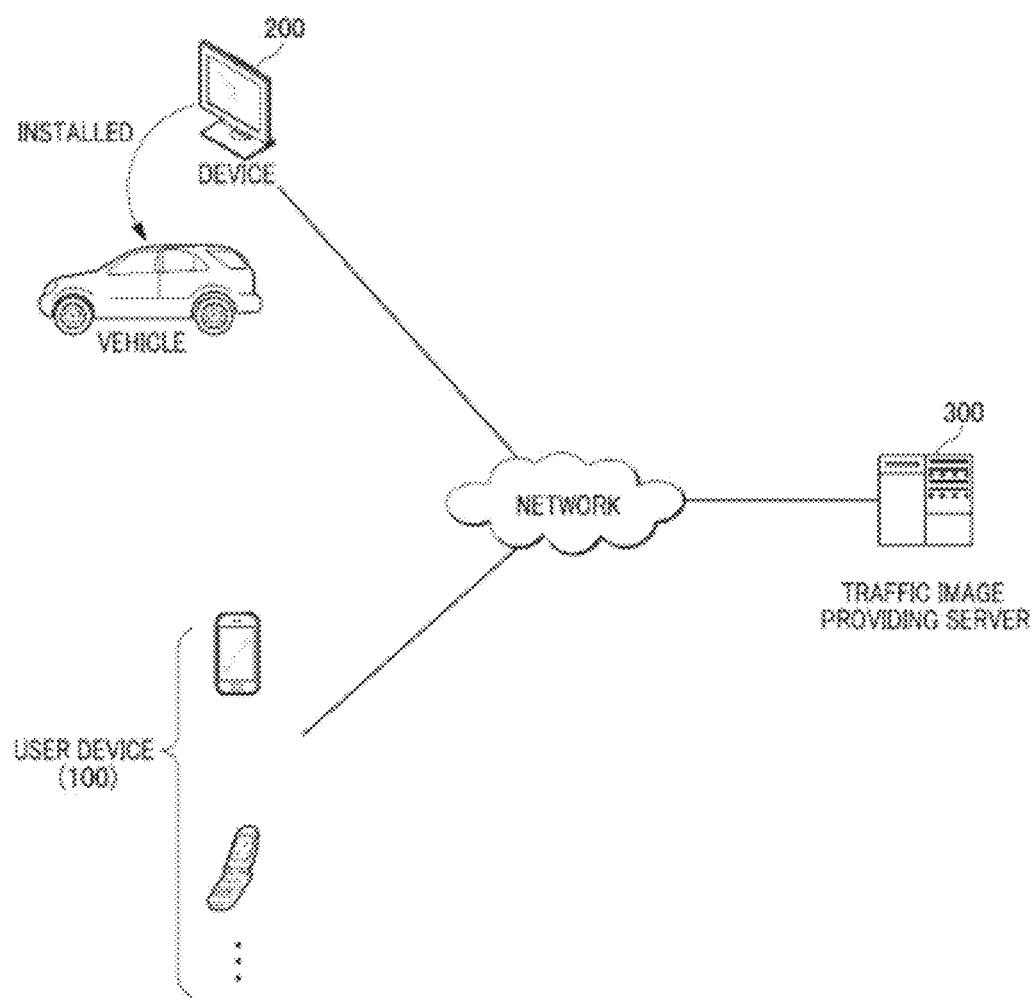
FIG. 1 is a view which illustrates a configuration of a system for providing traffic images by using location information, according to an exemplary embodiment.

Hereinafter, exemplary embodiments will be described in detail with reference to the accompanying drawings so that the present inventive concept may be readily implemented by those skilled in the art. However, it is to be noted that the present disclosure is not limited to the exemplary embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view which illustrates a configuration of a system for providing traffic images by using location information, according to an exemplary embodiment.

The system for providing traffic images by using location information according to an exemplary embodiment includes a user device 100, a device 200, and a traffic image providing server 300.

The user device 100 may include an application which provides traffic images to a user of the user device 100. An icon or menu form corresponding to the application is displayed on the screen of the device 100. When the user selects the icon or menu, the application provides traffic images.

Hereinafter, the operation of the user device 100 to provide traffic images via activation of the application installed in the user device 100 will be described.

Once the application is activated, the user device 100 requests a traffic image service from the traffic image providing server 300 via a network connection.

In particular, the user device 100 may send information relating to a location of the user device 100, such as, for example, global positioning system (GPS) coordinate-based location information, cell tower-based location information, Wi-Fi-based location information, or any other suitable type of location information, to the traffic image providing server 300.

As described above, the user device 100 sends information relating to a location of the user device 100 to the traffic image providing server 300. However, it may also be understood that the user device 100 sends information relating to a location of the user.

In particular, because the user carries and uses the user device 100, information relating to a location of the user device 100 and information relating to a location of the user may be regarded as having the same meaning.

The user device 100 may send, to the traffic image providing server 300, coordinates (e.g., GPS coordinates) of points on an electronic map which is displayed on the screen of the user device 100 that correspond to corners of the screen.

This configuration is intended to enable reception of information relating to vehicles located within an area encompassing the corners of the screen (e.g., a rectangular area, in a case of four corners), when the user device 100 receives vehicle information from the traffic image providing server 300.

The user device 100 may extract at least one coordinate of any one of the points on the map that correspond to the corners of the screen. The user device 100 may calculate a distance from the location of the user device 100 to the point indicated by the extracted at least one coordinate. The user device 100 may send the calculated distance to the traffic image providing server 300.

The user device 100 may set a location (i.e., a point on the map) selected by the user to be a center point, and extract at least one coordinate of any one of the points on the map that correspond to the corners of the screen. Thereafter, the user device 100 may calculate a distance from the center point to the point indicated by the extracted at least one coordinate, and send the distance to the traffic image providing server 300.

This configuration is intended to enable reception of information relating to vehicles located within a circular area having a radius equal to the calculated distance based on the location of the user device 100 or the particular location selected by the user, when the user device 100 receives information relating to vehicles from the traffic image providing server 300.

A detailed description of this configuration will be provided below with reference to FIGS. 6A and 6B.

Thereafter, the user device 100 may receive, from the traffic image providing server 300, information relating to vehicles (hereinafter, referred to as "vehicle information") which are located in relatively close proximity to the location of the user device 100 or in relatively close proximity to the particular location selected by the user on the map. The user device 100 may display each of the vehicles on the map and/or a location of each respective vehicle based on the received vehicle information.

In particular, the "vehicle information" may include an identifier (hereinafter, referred to as "ID"), a present location, a running speed, and/or any other relevant information relating to the corresponding vehicle.

Thereafter, once a particular vehicle on the map is selected by the user, the user device 100 may display a traffic image request interface, which includes vehicle information relating to the selected vehicle, on the screen.

The traffic image request interface will be described in detail below with reference to FIGS. 8A and 8B.

As described above, the user device 100 may display the vehicles on the map. However, the user device 100 may display the vehicles in a list form on the screen, instead of displaying the vehicles on the map.

If the vehicles located in relatively close proximity to the user device 100 are displayed in the list form, and any one of the vehicles in the list is selected by the user, the user device 100 may display vehicle information relating to the selected vehicle and the traffic image request interface on the screen.

Hereinafter, an example of the case for which vehicles are displayed on the map of the user device 100, and any one of the displayed vehicles is selected by the user such that traffic images are provided, will be described.

The user device 100 receives input indicating a selection of any one of the vehicles displayed on the map from the user. The user device 100 sends "traffic image request information," which includes an ID of the selected vehicle and an ID of the user device 100, to the traffic image providing server 300.

Thereafter, the user device 100 receives, from the traffic image providing server 300, a message which includes a "request acceptance" or a "request refusal" with regard to the requested traffic images, and displays the message on the screen.

If a message which includes a request acceptance is received from the traffic image providing server 300, the user device 100 may be provided with traffic images captured from the selected vehicle from the traffic image providing server 300 for a certain period of time, and the user device 100 may then display the traffic images on the screen.

The user device 100 may include any or all types of handheld-based radio communication devices that can be connected to the traffic image providing server 300 via a network, such as, for example, a mobile phone, a smart phone, a personal digital assistant (PDA), and a portable multimedia player (PMP). In addition, the user device 100 may include any of communication devices that can be connected to the traffic image providing server 300 via a network, such as a desktop PC, a tablet PC, a laptop PC, and a set-up box.

If the user device 100 is provided at a fixed position, such as, for example, a configuration for a set-up box, information relating to a location of the set-up box may include at least one GPS coordinate or an address matching ID or an IP address of the corresponding set-up box.

The device 200 may be installed with a separate application to provide traffic images. An icon or menu form corresponding to the application is displayed on the screen of the device 200. When the driver selects the corresponding icon or menu, the application is activated.

Hereinafter, the operation of the device 200, which provides traffic images via activation of the application included in the device 200, will be described.

The device 200 periodically sends an ID of the device 200, information relating to a location of the device 200, a vehicle running speed, and any other relevant information relating to the vehicle to the traffic image providing server 300.

As described above, the device 200 sends "ID of the device 200 and information relating to a location of the device 200" to the traffic image providing server 300. However, it may also be understood that the device 200 sends "ID of the vehicle and information relating to location of the vehicle" to the traffic image providing server 300.

In particular, because the device 200 is mounted in a vehicle, an ID of the vehicle and an ID of the device 200 may be regarded as having the same meaning, and information relating to a location of the vehicle and information relating to a location of the device 200 may be regarded as having the same meaning.

The device 200 displays the traffic image request of the user device 100 on the screen, and sends a selection of the driver in response to the traffic image request, i.e., selection information relating to an indication of acceptance of the traffic image request or information relating to an indication of refusal of the traffic image request to the traffic image providing server 300.

If the driver accepts the traffic image request, the device 200 captures the periphery of the vehicle for a predetermined period of time. For example, if the driver accepts the traffic image request, the device 200 captures the periphery of the vehicle. Thereafter, the device 200 sends the captured traffic images to the traffic image providing server 300.

In particular, the device 200 may include a capturing device capable of capturing the periphery of the vehicle, or the device 200 may be connected to a capturing device provided in the inside of the vehicle or outside the vehicle, such that the periphery of the vehicle is captured according to control of the driver of the vehicle.

In a situation in which records for traffic image providing by the driver of the vehicle are separately managed, if the driver accepts the traffic image request, a certain amount of costs (e.g., points or accumulated money) may be paid to the corresponding driver, such that providing traffic images can be actively induced.

The device 200 may include any or all types of handheld-based radio communication devices that can be connected to the traffic image providing server 300 via a network, such as a mobile phone, a smart phone, a PDA, and a PMP. In addition, the device 200 may include any of communication devices that can be connected to the traffic image providing server 300 via a network, such as a desktop PC, a tablet PC, a laptop PC, and a set-up box.

The traffic image providing server 300 receives, from the device 200, an ID of the device 200, information relating to a location of the device 200, and information relating to a running speed of the device 200, so as to identify a location of each vehicle, a running speed of the vehicle, and other relevant information relating to the corresponding vehicle.

The traffic image providing server 300 receives, from the user device 100, a traffic image service request, which includes information relating to a location of the user device 100 and coordinate values (e.g., GPS coordinates) of points on the map of the user device 100 that correspond to the corners of the screen.

Thereafter, the traffic image providing server 300 sets a virtual area (e.g., a rectangular area in a case of four corners of the screen) by using the coordinate values of the points that correspond to the corners of the screen. The traffic image providing server 300 detects vehicle information relating to vehicles located within the set virtual area and sends the detected vehicle information to the user device 100.

The traffic image providing server 300 may receive, from the user device 100, information relating to a location of the user device 100 and a distance value representing a certain range from the location of the user device 100.

In particular, the traffic image providing server 300 may receive information relating to a particular location selected by the user from the map displayed on the user device 100, instead of information relating to the location of the user device 100.

Thereafter, the traffic image providing server 300 may form a temporary circular area having a radius equal to the received distance value and having a center located at the location of the user device 100 or having a center located at the particular location selected by the user. The traffic image providing server 300 may detect vehicles located within the temporary circular area and send identifier of the vehicles to the user device 100.

Thereafter, the traffic image providing server 300 receives "traffic image request information" from the user device 100.

In particular, the "traffic image request information" may include an ID of a vehicle selected by the user and an ID of the user device 100.

Thereafter, the traffic image providing server 300 submits requests for traffic images to the device 200 of the selected vehicle, based on the "traffic image request information." The traffic image providing server 300 receives selection information, including a request acceptance or a request refusal, from the corresponding device 200, and sends a message which includes the received selection information to the user device 100.

If the device 200 accepts the traffic image request, the traffic image providing server 300 receives traffic images captured for a predetermined period of time from the corresponding device 200, and stores the traffic images in a database for a predetermined period of time.

Thereafter, the traffic image providing server 300 may send the traffic images captured by the device 200 to the user device 100, together with the message which includes the information that the traffic image request has been accepted.

If the device 200 refuses the traffic image request, the traffic image providing server 300 may send a message which includes the information that the traffic image request has been refused to the user device 100.

Figure 2:
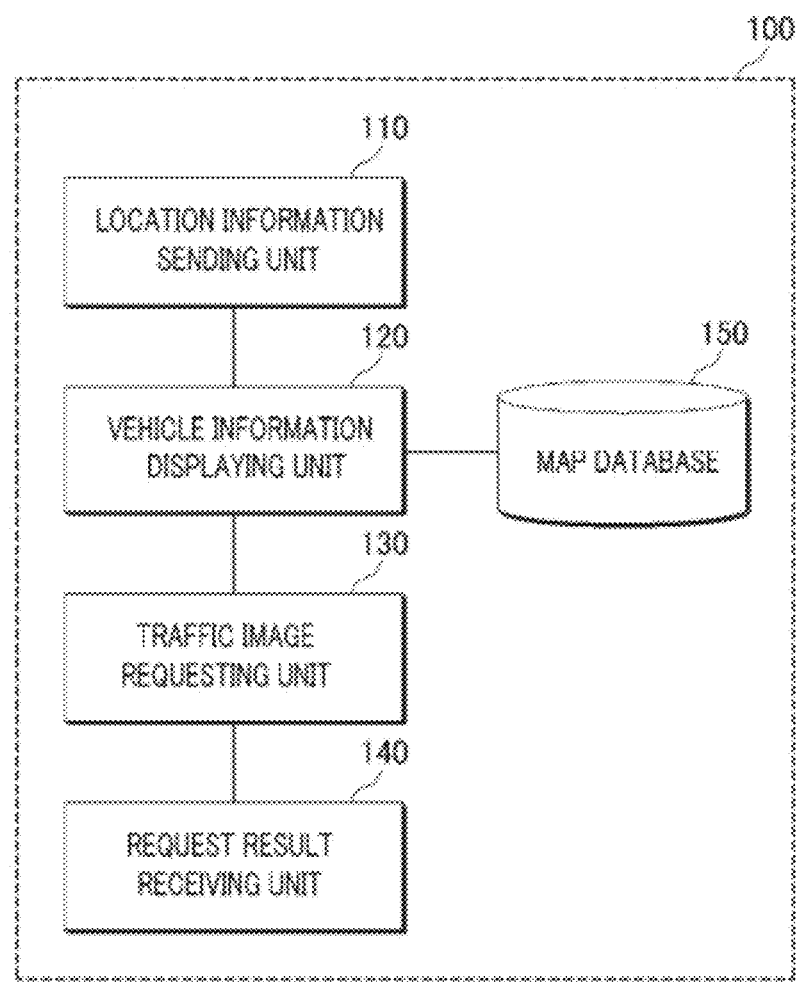
FIG. 2 is a block diagram which illustrates a configuration of a user device, according to an exemplary embodiment.

FIG. 2 is a block diagram which illustrates a configuration of a user device 100, according to an exemplary embodiment.

The user device 100 for providing a traffic image service according to an exemplary embodiment includes a location information sending unit 110, a vehicle information displaying unit 120, a traffic image requesting unit 130, a request result receiving unit 140, and a map database 150. Each of the location information sending unit 110, the vehicle information displaying unit 120, the traffic image requesting unit 130, and the request result receiving unit 140 may be embodied as a hardware component, such as, for example, dedicated circuitry or an integrated circuit or a microprocessor, or as a software module, such as, for example, firmware or a computer-readable medium which stores computer-executable instructions for performing a particular process or function. In particular, each of the location information sending unit 110, the traffic image requesting unit 130, and the request result receiving unit 140 may include a transmitter, a receiver, and/or a transceiver, or any other device or component which is capable of wired or wireless electronic communication, and the vehicle information displaying unit 120 may include a monitor, a display screen, or any other suitable device or component which is capable of displaying image data and/or electronic information. The map database 150 may be embodied as a memory or as any suitable type of device or software module which is capable of storing electronic information.

The location information sending unit 110 sends information relating to a location of the user device 100 to the traffic image providing server 300 via a network connection.

In particular, the information relating to a location of the user device 100 may include, for example, GPS-based location information, cell tower-based location information, Wi-Fi-based location information, and/or any other type of information which indicates a location.

In an exemplary embodiment, the location information sending unit 110 sends coordinates (e.g., GPS coordinates) of points on the map of the user device 100 that correspond to the corners of the screen to the traffic image providing server 300, together with the information relating to a location of the user device 100.

In this configuration, the user device 100 receives information relating to vehicles located within a square screen area (hereinafter, referred to as a "first screen area") formed by connecting the corners (i.e., four corners) of the screen, when the user device 100 receives vehicle information from the traffic image providing server 300.

The location information sending unit 110 extracts at least one coordinate of any one of the points on the map that correspond to the corners of the screen, and calculates a distance from the location of the user device 100 to the point indicated by the at least one extracted coordinate. The location information sending unit 110 then sends the calculated distance to the traffic image providing server 300, together with the information relating to a location of the user device 100.

The location information sending unit 110 may set a point on the map which is selected by the user to be a center point. The location information sending unit 110 may then extract at least one coordinate of any one of the points on the map that correspond to the corners of the screen.

Thereafter, the location information sending unit 110 may calculate a distance from the point indicated by the at least one extracted coordinate to the center point, and then send the calculated distance to the traffic image providing server 300, together with the information relating to a location of the user device 100.

In this configuration, the user device 100 is able to receive information relating to vehicles located within a circular area (hereinafter, referred to as a "second screen area") having a radius which is equal to the calculated distance value based on the location of the user device 100 or the particular location on the map which is selected by the user, when the user device 100 receives vehicle information from the traffic image providing server 300.

The vehicle information displaying unit 120 receives information relating to vehicles located within the first and/or second screen areas from the traffic image providing server 300. Based on the received vehicle information, the vehicle information displaying unit 120 performs mapping for each of the vehicles onto the map stored in the map database 150, and then displays the vehicles and/or a respective location of each of the vehicles on the screen.

The traffic image requesting unit 130 receives input relating to a selection of any one of the vehicles displayed and/or indicated on the map from the user. The traffic image requesting unit 130 sends "traffic image request information," which includes an ID of the selected device 200 and an ID of the user device 100, to the traffic image providing server 300.

The request result receiving unit 140 receives a message which includes either of a request acceptance or a request refusal from the traffic image providing server 300 in response to the request for traffic images sent by the traffic image requesting unit 130, and then displays the received message on the screen.

The map database 150 stores at least one electronic map which is capable of displaying a present location of the user device 100 and/or vehicles which are located in relatively close proximity to the user device 100 or the particular location selected by the user.

Figure 3:
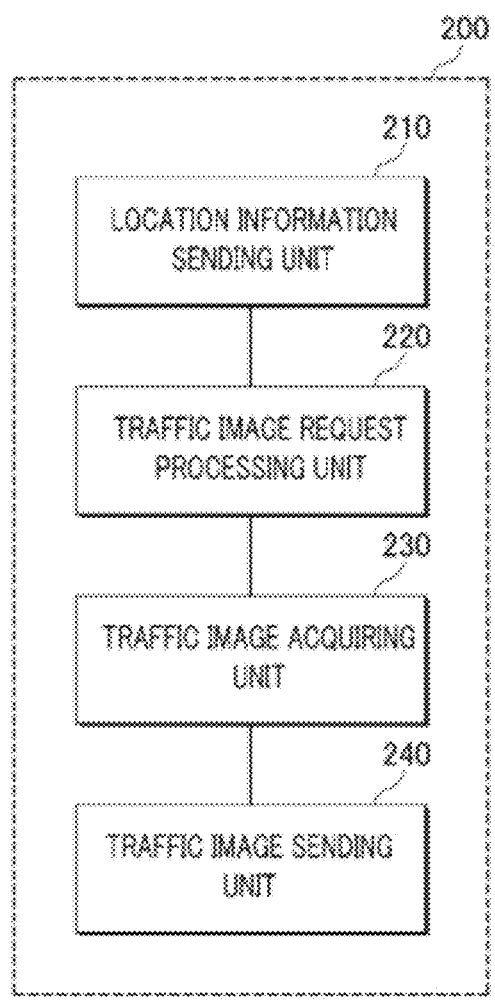
FIG. 3 is a block diagram which illustrates a configuration of a device for providing traffic images, according to an exemplary embodiment.

FIG. 3 is a block diagram which illustrates a configuration of a device 200 for providing traffic images, according to an exemplary embodiment.

The device 200 for providing traffic images according to an exemplary embodiment includes a location information sending unit 210, a traffic image request processing unit 220, a traffic image capturing unit 230, and a traffic image sending unit 240. Each of the location information sending unit 210, the traffic image request processing unit 220, the traffic image capturing unit 230, and the traffic image sending unit 240 may be embodied as a hardware component, such as, for example, dedicated circuitry or an integrated circuit or a microprocessor, or as a software module, such as, for example, firmware or a computer-readable medium which stores computer-executable instructions for performing a particular process or function. In particular, each of the location information sending unit 210 and the traffic image sending unit 240 may include a transmitter or a transceiver, or any other device or component which is capable of wired or wireless electronic communication, and the traffic image capturing unit 230 may include a camera, a video processor, or any other suitable device or component which is capable of capturing image data.

The location information sending unit 210 periodically sends an ID of the corresponding device 200, information relating to a location of the device 200, a running speed of vehicle in which the device 200 is installed, and any other relevant data relating to the vehicle in which the device 200 is installed to the traffic image providing server 300.

The traffic image request processing unit 220 receives, from the traffic image providing server 300, a traffic image request sent by the user, and displays the traffic image request on the screen. The traffic image request processing unit 220 sends selection information provided by the driver of the vehicle in which the device 200 is installed in response to the traffic image request which is displayed on the screen, i.e., selection information which includes either a "request acceptance" or a "request refusal," to the traffic image providing server 300.

If a "request acceptance" is selected in response to the traffic image request, the traffic image capturing unit 230 captures traffic images relating to the periphery of the vehicle for a predetermined period of time, and then sends the captured traffic images to the traffic image sending unit 240.

If the driver of the vehicle selects a particular button or menu for an emergency capturing circumstance, the traffic image capturing unit 230 may capture traffic images relating to the periphery of the vehicle and send the captured images to the traffic image sending unit 240. In particular, the traffic image capturing unit 230 may also send information which includes a notification that the captured images have been captured in the emergency circumstance.

For example, the emergency circumstance may be occurrence of a traffic accident which has occurred in relatively close proximity to the vehicle, or a violation of the traffic rules by a particular vehicle.

A detailed description of emergency capturing will be provided below with respect to FIGS. 10A and 10B.

The traffic image sending unit 240 sends the traffic images captured by the traffic image capturing unit 230 to the traffic image providing server 300.

If the traffic images sent from the traffic image capturing unit 240 have been captured in an emergency circumstance, the traffic image sending unit 240 may send the corresponding traffic images to the traffic image providing server 300 and/or to a server of a related organization. In particular, the traffic image sending unit 240 may also send information relating to a location of the device 200 at the time when the traffic images are captured.

Figure 4:
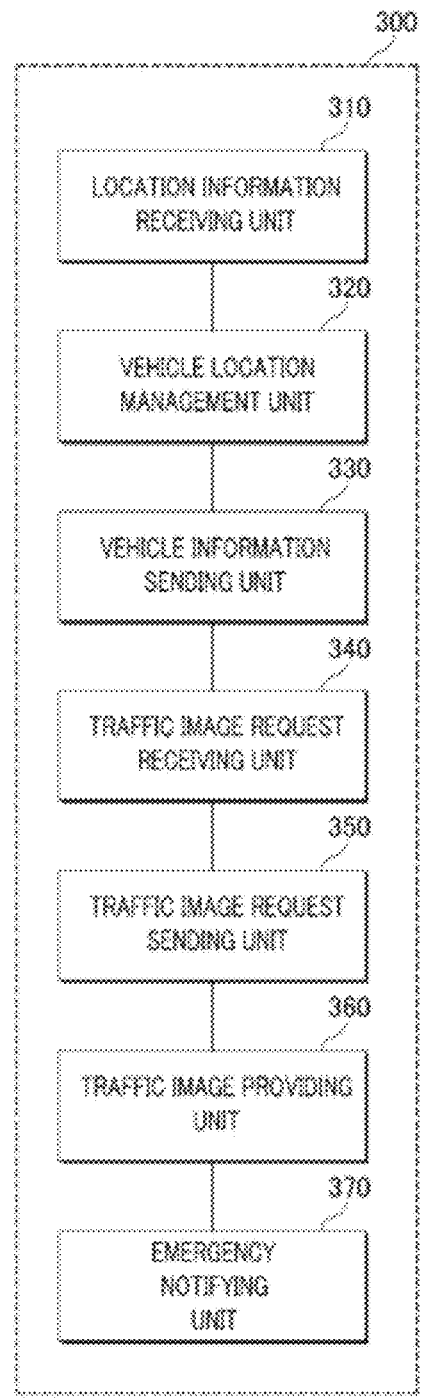
FIG. 4 is a block diagram which illustrates a configuration of a traffic image providing server for providing traffic images, according to an exemplary embodiment.

FIG. 4 is a block diagram which illustrates a configuration of a traffic image providing server 300 for providing traffic images, according to an exemplary embodiment.

The traffic image providing server 300 includes a location information receiving unit 310, a vehicle location management unit 320, a vehicle information sending unit 330, a traffic image request receiving unit 340, a traffic image sending unit 350, a traffic image providing unit 360, and an emergency notifying unit 370. Each of the location information receiving unit 310, the vehicle location management unit 320, the vehicle information sending unit 330, the traffic image request receiving unit 340, the traffic image sending unit 350, the traffic image providing unit 360, and the emergency notifying unit 370 may be embodied as a hardware component, such as, for example, dedicated circuitry or an integrated circuit or a microprocessor, or as a software module, such as, for example, firmware or a computer-readable medium which stores computer-executable instructions for performing a particular process or function. In particular, each of the location information receiving unit 310, the vehicle information sending unit 330, the traffic image request receiving unit 340, the traffic image sending unit 350, the traffic image providing unit 360, and the emergency notifying unit 370 may include a transmitter, a receiver, and/or a transceiver, or any other device or component which is capable of wired or wireless electronic communication.

The location information receiving unit 310 periodically receives, from the device 200, an ID of the corresponding device 200, information relating to a location of the device 200, information relating to a running speed of a vehicle in which the device 200 is installed, and any other relevant information relating to the vehicle in which the device 200 is installed, and sends them to the vehicle location management unit 320.

The location information receiving unit 310 receives, from the user device 100, a traffic image service request, which includes information relating to a location of the user device 100 and coordinate values (e.g., GPS coordinates) of points on the map which is displayed by the user device 100 that correspond to the corners of the screen. The location information receiving unit 310 then sends the request to the vehicle location management unit 320.

The location information receiving unit 310 may receive, from the user device 100, information relating to a location of the user device 100 and information relating to a distance corresponding to a predetermined range with respect to the location of the user device 100. The location information receiving unit 310 then sends the received information to the vehicle location management unit 320.

The location information receiving unit 310 may receive, from the user device 100, information relating to a location of a point on the map displayed on the screen which is selected by the user, and information relating to a distance corresponding to a predetermined range with respect to a location of the selected point. The location information receiving unit 310 then sends the received information to the vehicle location management unit 320.

The vehicle location management unit 320 periodically receives, from the location information receiving unit 310, an ID of the corresponding device 200, information relating to a location of the device 200, information relating to a running speed of a vehicle in which the device 200 is installed, and other relevant information relating to the vehicle, so as to identify a location of each respective vehicle provided with the device 200, and a running speed of the respective vehicle.

In one exemplary embodiment, the vehicle location management unit 320 receives, from the location information receiving unit 310, information relating to a location of the user device 100 and coordinates (e.g., GPS coordinates) of points on the map displayed by the user device 100 that correspond to the corners of the screen. The vehicle location management unit 320 detects information relating to vehicles located within an area indicated by the coordinate values of the points corresponding to the corners of the screen, i.e., the first screen area, and sends the detected information to the vehicle information sending unit 330.

In another exemplary embodiment, the vehicle location management unit 320 receives, from the location information receiving unit 310, information relating to a location of the user device 100 and information relating to a distance corresponding to a predetermined range with respect to the location of the user device 100. The vehicle location management unit 320 forms a temporary circular area having a radius equal to the corresponding distance value and a center located at the location of the user device 100, i.e., the second screen area.

In yet another exemplary embodiment, the vehicle location management unit 320 receives, from the location information receiving unit 310, information relating to a particular location on the map displayed by the user device 100 which is selected by the user and a distance corresponding to a predetermined range with respect to the selected particular location. The vehicle location management unit 320 may form a temporary circular area (for convenience, referred to hereinafter as "the second screen area") having a radius which is equal to the distance corresponding to the predetermined range and a center which is located at the selected particular location.

Thereafter, the vehicle location management unit 320 may detect vehicles located within the second screen area, and then send identifiers of the detected vehicles to the vehicle information sending unit 330.

The vehicle information sending unit 330 receives, from the vehicle location management unit 320, information relating to detected vehicles located within the first or second screen area, and then sends the received information to the user device 100 that has requested the traffic image service.

The traffic image request receiving unit 340 receives, from the user device 100, traffic image request information, which includes an ID of the device 200 of the vehicle selected by the user and an ID of the user device 100, and sends the received traffic image request information to the traffic image requesting unit 350.

Based on the traffic image request information received from the traffic image request receiving unit 340, the traffic image requesting unit 350 submits a request for traffic images to the device 200 of the vehicle selected by the user.

Thereafter, the traffic image requesting unit 350 receives, from the corresponding device 200, selection information which includes either a traffic image request acceptance or a traffic image request refusal. If the traffic image request is accepted, the traffic image requesting unit 350 may receive traffic images and information relating to respective times when the traffic images are captured from the corresponding device 200. The traffic image requesting unit 350 may then send the received traffic images and information to the traffic image providing unit 360.

The traffic image providing unit 360 provides the traffic images received from the traffic image requesting unit 350 to the user device 100. The traffic image providing unit 360 may assign a respective ID to each of the traffic images.

Thereafter, the traffic image providing unit 360 may perform mapping by using an ID of the device 200 that has captured and sent the traffic images, information relating to a location of the device 200, a respective ID of each of the traffic images captured in the device 200, and the respective times when the traffic images are captured. The traffic image providing unit 360 may store the traffic images for a predetermined period of time (e.g., 5 minutes).

Thereafter, if the device 200 that has provided the corresponding traffic images is selected again by another user within the predetermined period of time, during which traffic images are stored, the traffic image providing unit 360 may send the previously stored traffic images to a user device of the user.

For example, if a user A selects a vehicle V which is running on a road R of a street X and receives traffic images T at 9:30 a.m., the traffic image providing unit 360 performs mapping by using the information relating to the vehicle V, the traffic images T, the road R, and the time of 9:30, and stores the information in a temporary storage buffer for 5 minutes.

Thereafter, if a user B selects the vehicle V which is running on a road R of a street Y at 9:32 a.m. and requests traffic images thereof, the traffic image providing unit 360 submits a request for traffic images to the vehicle V. If the request is accepted, the traffic image providing unit 360 may provide the previously stored traffic images T to the user B.

If a user C selects the vehicle V which is running on a road R of a street Z at 9:40 a.m. and requests traffic images thereof, the traffic image providing unit 360 receives new traffic images captured at 9:40 a.m. from the vehicle V and provides the traffic images to the user C.

When an emergency reporting request is received from the device 200, the emergency notifying unit 370 receives information relating to a location of the device 200 that has made the emergency reporting request, and traffic images captured by the device 200 that has made the emergency reporting request. The emergency notifying unit 370 may send the received information and the captured images to a server of a related organization, such as, for example, a server operated by a national police agency or a server operated by the Korea Highway Corporation.

The configuration units illustrated in FIGS. 2, 3, and 4 may include software or hardware configuration units, such as, for example, a field programmable gate array (FPGA) or an application specific integrated circuit (ASIC). Accordingly, each unit may be configured to execute its respective functions.

However, the "configuration units" described above are not limited to software or hardware. For example, each of the configuration units may be configured to be stored in a storage medium that can be addressed or configured to operate one or more processors.

For example, the configuration units may include one or more of the following: software configuration units, object-oriented software configuration units, class configuration units, and task configuration units, processes, functions, properties, procedures, sub-routines, segments of a program code, drivers, firmware, micro codes, circuits, data, database, data structures, tables, arrays, and variables.

The configuration units and the functions provided in the corresponding configuration units may be combined such that a lesser number of separate configuration units are employed, or may be further divided into additional configuration units.

FIG. 5 is a flow chart which illustrates a process for providing traffic images, according to an exemplary embodiment.

Hereinafter, the flow chart of FIG. 5 will be described with reference to the configuration of the system illustrated in FIG. 1.

First, in operation S501, the traffic image providing server 300 periodically receives, from each of a plurality of devices which are installed in respective vehicles, an ID of each of the plurality of devices, information relating to a location of each vehicle, information relating to a running speed of each vehicle, and other relevant information relating to each respective vehicle, so as to identify a location of each vehicle and a running speed of the respective vehicle.

After operation S501, in operation S502, the traffic image providing server 300 receives, from the user device 100, a traffic image request, which includes information relating to a location of the user device 100 and coordinates (e.g., GPS coordinates) of points on the map displayed by the user device 100 that correspond to the corners of the screen.

The traffic image providing server 300 may receive, from the user device 100, information relating to a location of the user device 100 and information relating to a distance corresponding to a predetermined range with respect to the location of the user device 100.

The traffic image providing server 300 may receive information relating to a location of a particular point on the map displayed by the user device 100 which is selected by the user and information relating to a distance value corresponding to a predetermined range with respect to the selected point.

In operation S503, the traffic image providing server 300 detects at least one vehicle located within an area indicated by the received traffic image request, and sends information relating to a location of the detected at least one vehicle to the user device 100.

After operation S503, in operation S504, the traffic image providing server 300 receives information relating to the traffic image request from the user device 100.

In particular, the information relating to the traffic image request may include an ID of the vehicle selected by the user and an ID of the user device 100.

After operation S504, in operation S505, the traffic image providing server 300 submits a request for traffic images to the device 200 which is installed in the selected vehicle, based on the received information relating to the traffic image request.

In operation S506, the traffic image providing server 300 receives, from the corresponding device 200, information relating to a selection of acceptance or refusal in response to the traffic image request, which selection is indicated by the device 200 installed in the selected vehicle.

If the driver of the selected vehicle selects traffic image request acceptance in response to the traffic image request, the traffic image providing server 300 also receives traffic images captured for a predetermined period of time by the corresponding device 200.

After operation S506, in operation S507, the traffic image providing server 300 provides the received traffic images to the user device 100.

Figure 6A:
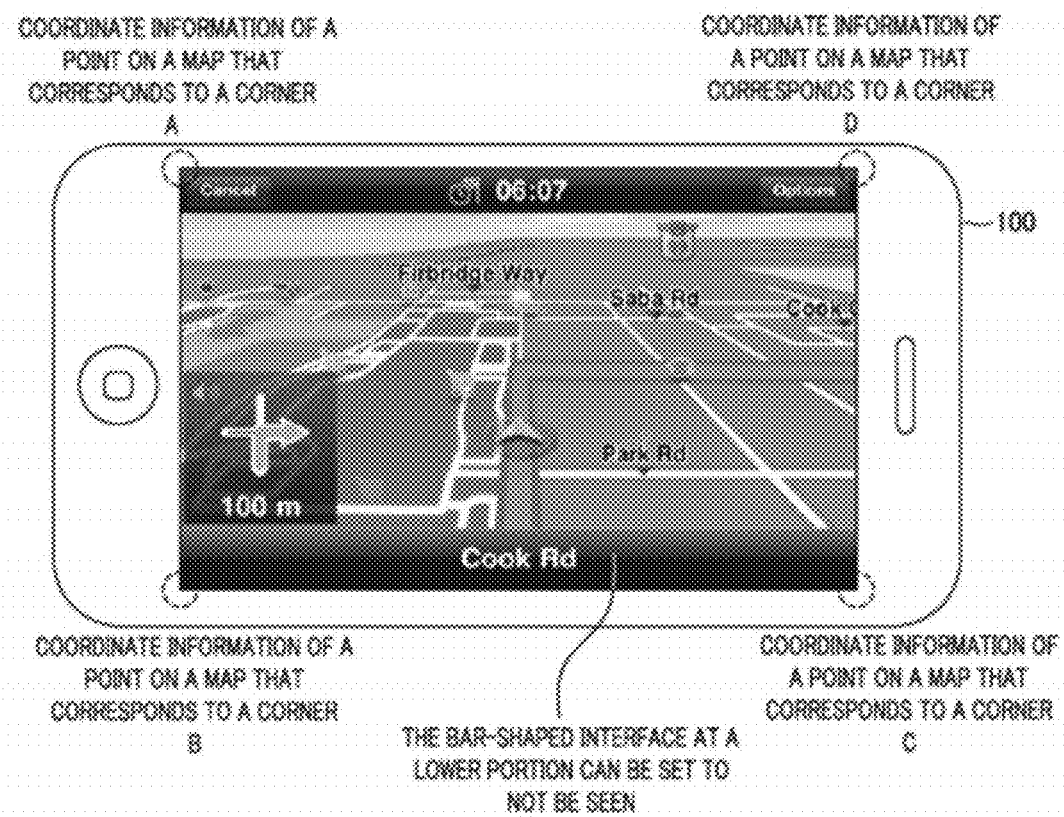
FIG. 6A is a view which illustrates coordinate information relating to points on a map of a user device that corresponds to corners of a screen, according to an exemplary embodiment.

FIG. 6A is a view which illustrates coordinate information relating to points on a map displayed by a user device that corresponds to corners of a screen, according to an exemplary embodiment.

As described above, when the user device 100 submits a request for a traffic image service to the traffic image providing server 300, the traffic image providing server 300 sends information relating to vehicles located in relatively close proximity to the user device 100, or which are running in relatively close proximity to the user device 100, to the user device 100.

In an exemplary embodiment, the traffic image providing server 300 sets a location of the user device 100 to be a center point on the map displayed by the user device 100. Based on the coordinate values (e.g., GPS coordinates) of the points on the map of the user device 100 that correspond to the corners of the screen, the traffic image providing server 300 may detect vehicles located within an area indicated by the coordinate values.

For example, as illustrated in FIG. 6A, if the screen of the user device 100 is in a rectangular shape, the user device 100 sends GPS coordinate values of the points A, B, C, and D on the map displayed by the user device, which points correspond to the corners of the screen, to the traffic image providing server 300.

In particular, the user device 100 may set the location of the user device 100 to be a center point of the map.

Thereafter, the traffic image providing server 300 determines a virtual area by using four sets of GPS coordinate values received from the user device 100, and detects vehicles located within the determined virtual area.

The traffic image providing server 300 periodically receives, from the device 200, an ID of the corresponding device 200, information relating to a location of the device 200, information relating to a running speed of a vehicle in which the device 200 is installed, and other relevant information relating to the corresponding vehicle, so as to identify a respective location of each vehicle.

FIG. 6B is a view which illustrates a distance from a user device to a point on a map displayed by the user device that corresponds to a corner of a screen, according to an exemplary embodiment.

As described above, when the user device 100 submits a request for a traffic image service to the traffic image providing server 300, the traffic image providing server 300 sends information relating to vehicles located in relatively close proximity to the user device 100. In particular, the traffic image providing server 300 may detect vehicles located within a temporary circular area having a radius of a predetermined distance value with respect to the location of the user device 100.

FIG. 6C is a view which illustrates a distance from a user-selected point to a point on a map displayed by a user device that corresponds to a corner of a screen, according to another exemplary embodiment.

The traffic image providing server 300 sets a particular point on the map displayed by the user device 100 which is selected by the user to be a center point of the screen (or the map displayed on the screen). The traffic image providing server 300 also sets a temporary circular area having a radius equal to the distance value from the center point to a corner D of the screen.

Thereafter, the traffic image providing server 300 may detect vehicles located within the set temporary circular area.

For example, even if a vehicle of a user is located in front of a subway station, in order to identify traffic states of an expressway, the user may select a particular point which is located on the expressway from the map displayed by the user device 100.

Figure 7A:
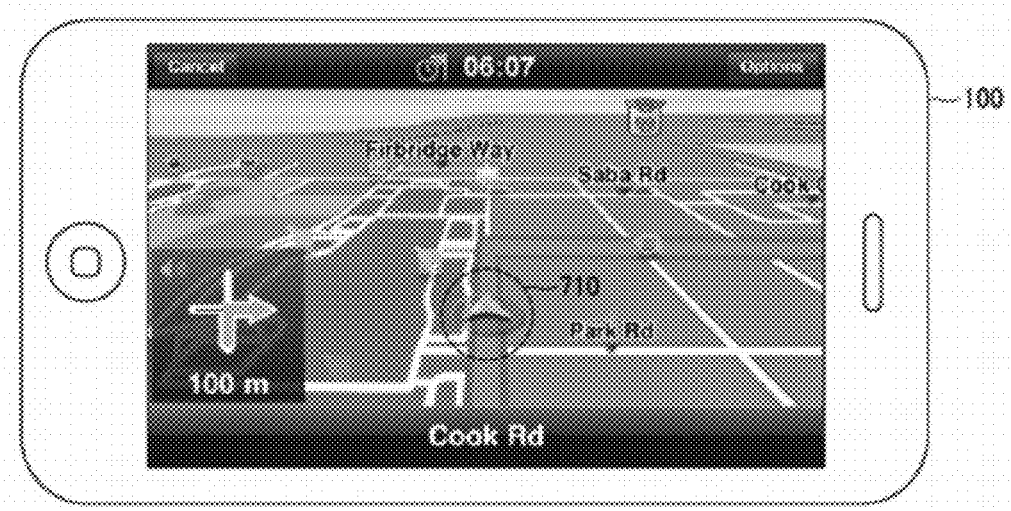
FIGS. 7A, 7B, and 7C are views which illustrate respective screens of a user device, according to an exemplary embodiment.
Figure 7B:
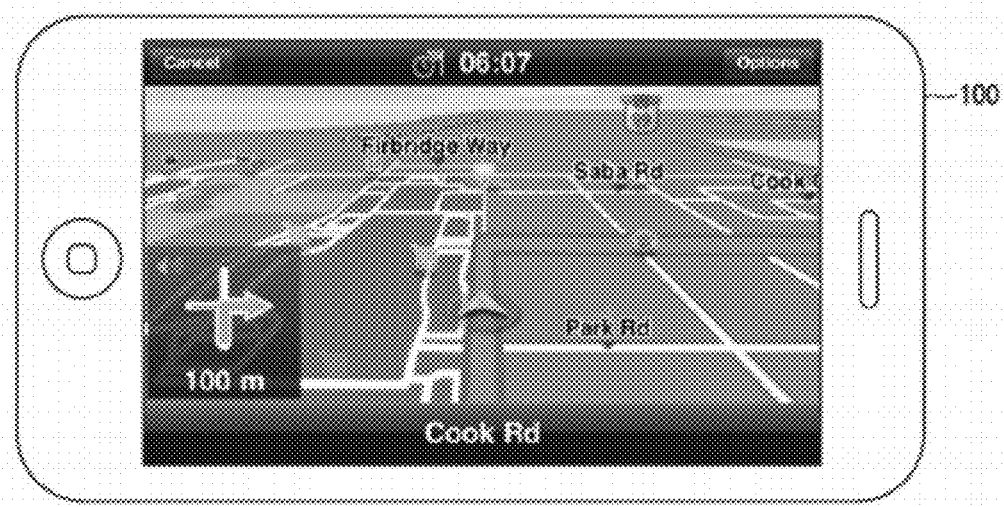
Figure 7C:
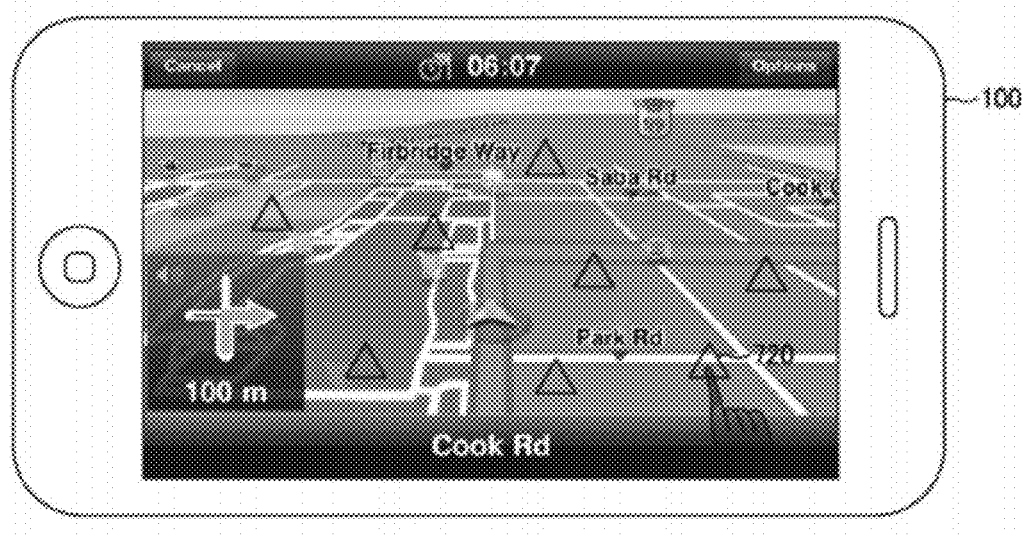

FIGS. 7A, 7B, and 7C are views which illustrate respective screens of a user device, according to an exemplary embodiment.

In FIG. 7A, a location of the user 710 is indicated on the map displayed by the user device 100.

In FIG. 7B, the user device 100 submits a request for traffic images to the traffic image providing server 300. The user device 100 receives information relating to vehicles located in relatively close proximity to the user 710 from the traffic image providing server 300, and indicates a respective location of each of the vehicles on the map displayed thereon. For example, the user device 100 may display respective icons, each of which corresponds to a respective one of the vehicles, on the map.

FIG. 7C illustrates a selection 720 of one of the vehicles displayed on the map which selection is made by the user.

Figure 8A:
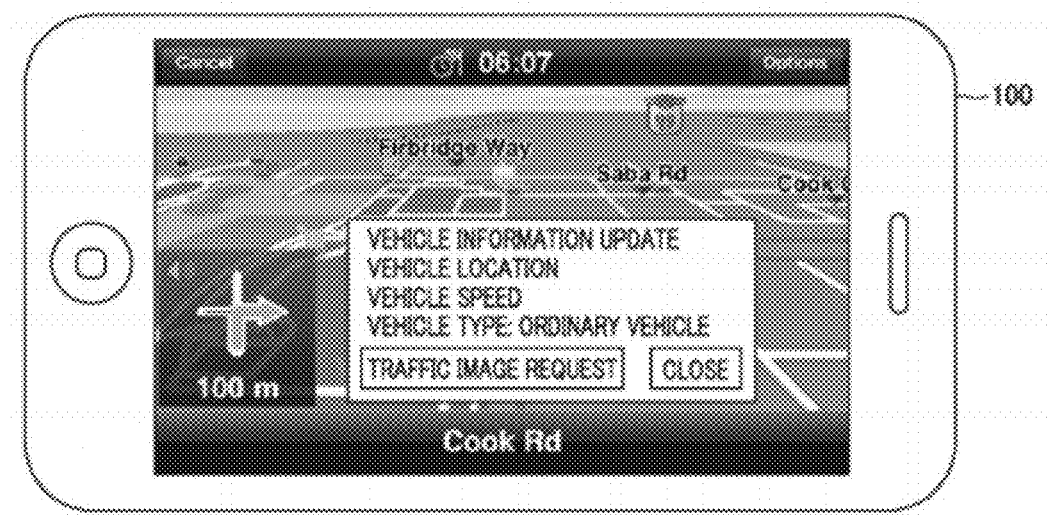
FIGS. 8A and 8B are views which illustrate a traffic image request-related interface which is displayed on a user device, according to an exemplary embodiment.
Figure 8B:
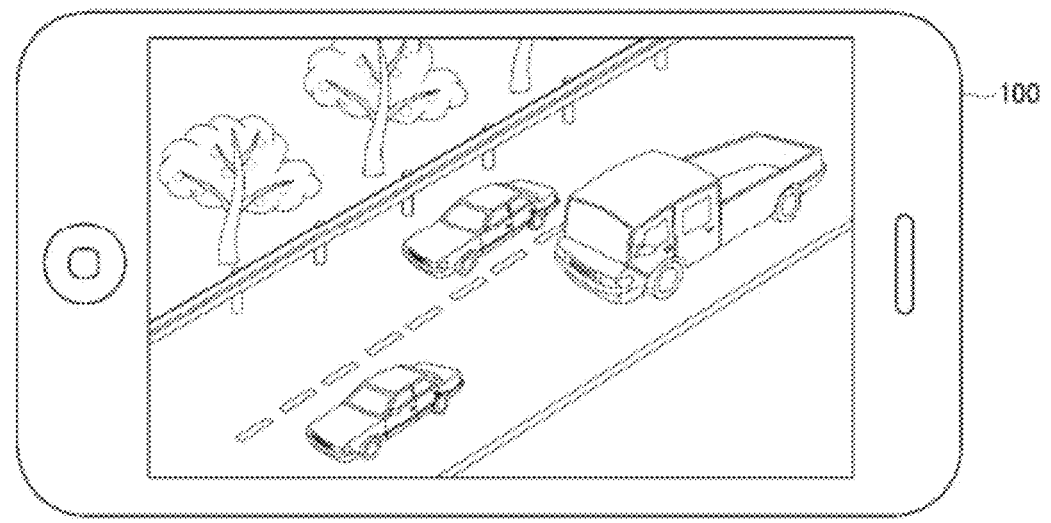

FIGS. 8A and 8B are views which illustrate a traffic image request-related interface which is displayed on a user device, according to an exemplary embodiment When the user selects one of the vehicles displayed on the map, as illustrated, for example, in FIG. 7C, the user device 100 displays the traffic image request interface on the screen as shown in FIG. 8A.

The traffic image request interface may include, for example, a location, a running speed, and a vehicle type relating to the vehicle selected by the user. If the user selects a traffic image request button, the user device 100 sends "traffic image request information," which includes an ID of the selected vehicle and an ID of the user device 100, to the traffic image providing server 300.

FIG. 8B is a view which illustrates that when the user device 100 receives a traffic image request acceptance message, the user device 100 receives traffic images from the traffic image providing server 300, and displays the received traffic images on the screen.

Figure 9:
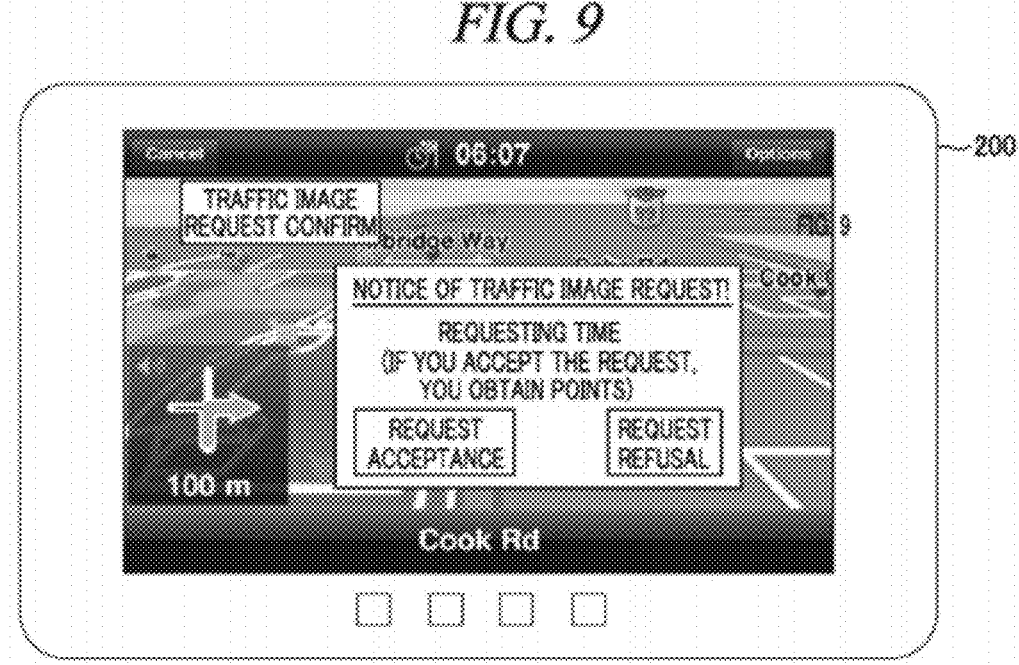
FIG. 9 is a view which illustrates a screen of a device, according to an exemplary embodiment.

FIG. 9 is a view which illustrates a screen of a device, according to an exemplary embodiment.

FIG. 9 is a view which illustrates that the screen displays a traffic image request which has been submitted by the user and received from the traffic image providing server 300.

The driver of the vehicle that has received a traffic image request may select an acceptance button or a refusal button in response to the traffic image request.

If the driver of the corresponding vehicle selects the request acceptance button, the device 200 captures images relating to the periphery of the vehicle for a predetermined period of time. Thereafter, the device 200 sends the captured traffic images to the traffic image providing server 300.

Figure 10A:
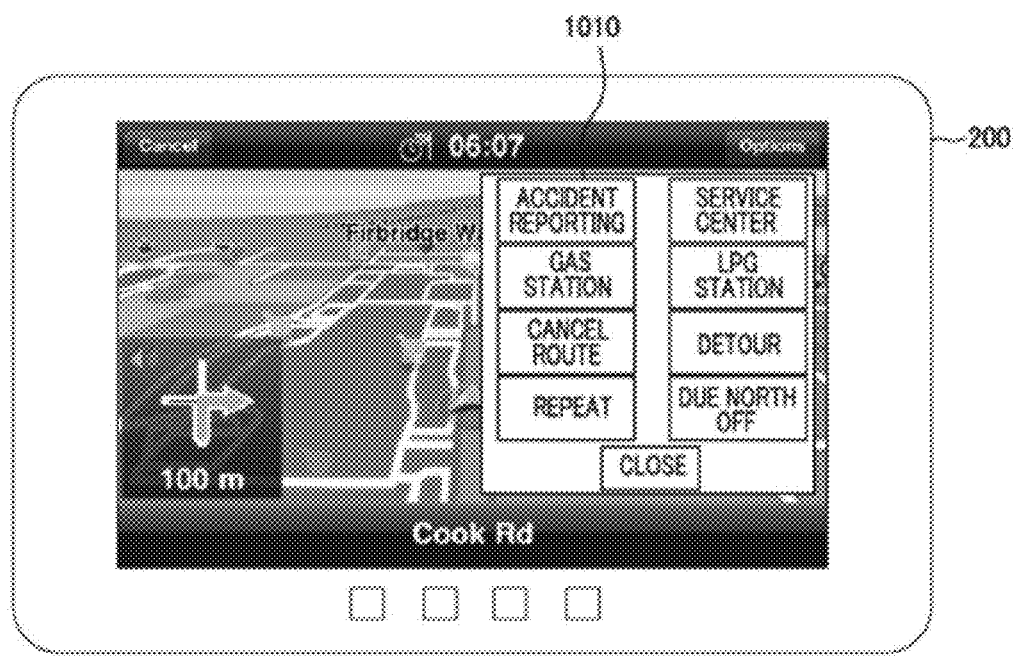
FIGS. 10A and 10B are views which illustrate a screen of a device, according to another exemplary embodiment.
Figure 10B:
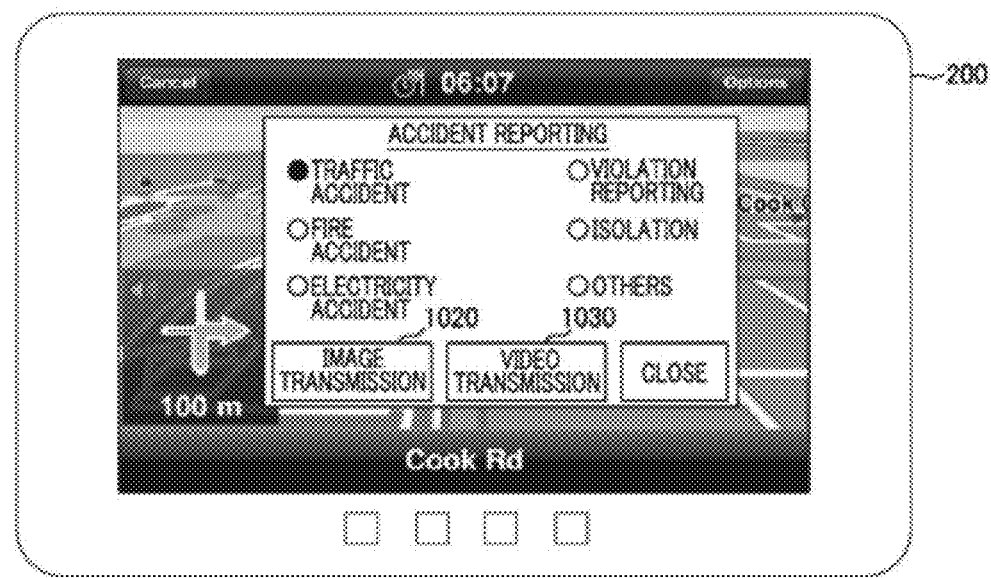

FIGS. 10A and 10B are views which illustrate a screen of a device, according to another exemplary embodiment.

In FIG. 10A, in a situation in which a traffic accident occurs within a relatively close proximity to the vehicle provided with the device 200, or a fire or other similar incident occurs, or a particular vehicle violates the traffic rules, the driver of the vehicle may select a particular button 1010 which is displayed on the screen of the device 200.

Thereafter, when the particular button is selected, the interface illustrated in FIG. 10B is displayed on the screen of the device 200. When the driver of the vehicle selects one of types of notification (e.g., "traffic accident," "fire accident," "electricity accident," "violation reporting," "isolation," and "others"), and then, selects an image transmission button 1020, the device 200 can send captured images relating to the periphery of the vehicle to the traffic image providing server 300.

If the driver of the vehicle selects a video transmission button 1030, the device 200 may send captured video, such as, for example, streaming video footage relating to the periphery of the vehicle to the traffic image providing server 300.

In particular, in addition to the images or videos to be sent, the device 200 may send information relating to a notification that the corresponding images or videos have been captured in an emergency circumstance (e.g., a predetermined code which indicates an emergency circumstance), information relating to a type of the notification selected by the driver of the vehicle, and location information relating to the device 100 to the traffic image providing server 300.

The exemplary embodiments may be embodied in a transitory or non-transitory storage medium which includes instruction codes which are executable by a computer or processor, such as a program module which is executable by the computer or processor. A data structure in accordance with the exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of the exemplary embodiments is provided for the purpose of illustration, and it will be understood by those skilled in the art that various changes and modifications may be made without changing a technical conception and/or any essential features of the exemplary embodiments. Thus, the above-described exemplary embodiments are illustrative in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of the exemplary embodiments. It shall be understood that all modifications and embodiments conceived from the meaning and scope of the claims and their equivalents are included in the scope of the present inventive concept.

What is claimed is:

1. A server for providing a traffic image, the server comprising:
   a location information receiving unit which periodically receives, from each of a plurality of devices which are installed in respective vehicles, information relating to a respective location of each of the vehicles;
   a vehicle location management unit which receives a traffic image request including information relating to a particular area from a first user device, and which detects at least two vehicles located within the particular area based on the location information;
   a vehicle information sending unit which sends information relating to the detected at least two vehicles to the first user device;
   a traffic image requesting unit which receives information relating to a vehicle selected from among the detected at least two vehicles from the first user device, and which requests, from a device installed in the selected vehicle, transmission of a traffic image of the selected vehicle; and
   a traffic image providing unit which, when the device installed in the selected vehicle accepts the request for transmission of the traffic image of the selected vehicle based on a user input, receives the transmitted traffic image and provides, to the first user device, the traffic image and information which relates to a respective location of each of the detected at least two vehicles which is usable for displaying each of the detected at least two vehicles on a map,
   wherein, when the device installed in the selected vehicle refuses the request for transmission of the traffic image of the selected vehicle based on a user input, the traffic image providing unit transmits, to the first user device, a message which includes information that the traffic image request has been refused,
   wherein the device installed in the selected vehicle is configured to provide a first user interface screen which includes a plurality of selectable buttons which correspond to information relating to the selected vehicle, and
   wherein when a button from among the plurality of selectable buttons is selected, the device installed in the selected vehicle is further configured to provide a second user interface screen which includes a first selectable button relating to transmitting a captured image and a second selectable button relating to transmitting streaming video.

2. The server of claim 1, wherein the traffic image providing unit is configured to store the received traffic image for a predetermined period of time, and
   wherein, when information relating to the selected vehicle is received from a second user device within the predetermined period of time, the traffic image providing unit is further configured to provide the stored traffic image to the second user device.

3. The server of claim 1, wherein the location information receiving unit is configured to receive information relating to the particular area, and
   wherein the information relating to the particular area includes information relating to a location of the first user device and information relating to a distance between a point from which is selected from within the particular area and the location of the first user device.

4. The server of claim 3, wherein the vehicle location management unit is configured to define a substantially circular virtual area having a center which is located at the location of the first user device and a radius which is equal to the distance between the selected point and the location of the first user device, and to detect at least one vehicle located within the defined virtual area.

5. The server of claim 1, wherein the location information receiving unit is configured to receive information relating to the particular area, and
   wherein the information relating to the particular area includes coordinates of a first point on a map which is displayed on a screen of the first user device and which first point is selected by a user of the first user device, and a distance between the first point and a second point which is selected from within the particular area.

6. The server of claim 5, wherein the vehicle location management unit is configured to define a substantially virtual area having a center which is located at the selected point and a radius which is equal to the distance between the first point and the second point, and to detect at least one vehicle located within the virtual area.

7. The server of claim 1, further comprising:
   an emergency notifying unit which, when an emergency request is received from a notifying device among the plurality of devices, receives information relating to a location of a vehicle in which the notifying device is installed and a traffic image captured by the notifying device, and which sends the received traffic image to a predetermined destination.

8. A user device for displaying a traffic image, the device comprising:
   a location information sending unit which sends information relating to a particular area which is selected by a user to a server;
   a vehicle information display unit which receives information relating to at least two vehicles located within the particular area from the server, and which displays a location of the at least two vehicles on a map;
   a traffic image requesting unit which receives information relating to a selected vehicle from among the at least two vehicles, and which requests, from the server, transmission of a traffic image captured by a device installed in the selected vehicle; and
   a display unit which, when the device installed in the selected vehicle accepts a corresponding request for transmission of the traffic image based on an user input, receives the traffic image from the server, and which displays the received traffic image on a screen, and which further receives information which relates to a respective location of each of the at least two vehicles which is usable for displaying each of the at least two vehicles on a map,
   wherein, when the device installed in the selected vehicle refuses the corresponding request for transmission of the traffic image based on a user input, the display unit receives a message which includes information that the traffic image request has been refused and displays the received message on the screen, wherein the device installed in the selected vehicle is configured to provide a first user interface screen which includes a plurality of selectable buttons which correspond to information relating to the selected vehicle, and wherein, when a button from among the plurality of selectable buttons is selected, the device installed in the selected vehicle is further configured to provide a second user interface screen which includes a first selectable button relating to transmitting a captured image and a second selectable button relating to transmitting streaming video.

9. The user device of claim 8, wherein the information relating to the particular area includes information relating to a location of the user and a distance between the location of the user and a first point selected from within the particular area, and the particular area is a substantially circular virtual area having a center which is located at the location of the user and a radius which is equal to the distance between the location of the user and the first point.

10. The user device of claim 8, wherein the information relating to the particular area includes coordinates of a second point on a map which is displayed on a screen and which second point is selected by the user, and a distance between the second point and a third point which is selected from within the particular area, and the particular area is a substantially circular virtual area having a center which is located at the second point and a radius which is equal to the distance between the second point and the third point.

11. The user device of claim 8, wherein the information relating to at least one vehicle includes at least one of an identifier, a present location, and a speed of each of the at least one vehicle.

12. A method for providing a traffic image, comprising:
receiving information relating to a respective location of each of a plurality of vehicles;
receiving a request for image data, which request includes information relating to a particular area;
detecting at least two vehicles from among the plurality of vehicles which is located in the particular area;
submitting, to a selected vehicle from among the detected at least two vehicles, a request for a traffic image relating to the detected at least two vehicles; and
receiving, in response to the submitted request, a traffic image captured by the selected vehicle and information which relates to a respective location of each of the detected at least two vehicles which is usable for displaying each of the detected at least two vehicles on a map, when the submitted request is accepted based on a user input,
wherein, when the submitted request is refused based on a user input, the method further comprises receiving a message which includes information that the traffic image request has been refused,
wherein a device installed in the selected vehicle is configured to provide a first user interface screen which includes a plurality of selectable buttons which correspond to information relating to the selected vehicle, and
wherein, when a button from among the plurality of selectable buttons is selected, the device installed in the selected vehicle is further configured to provide a second user interface screen which includes a first selectable button relating to transmitting a captured image and a second selectable button relating to transmitting streaming video.

13. The method of claim 12, wherein the information relating to a particular area includes information relating to a location of a device from which the request for image data was received.

14. The method of claim 12, wherein the information relating to a particular area includes information relating to a location selected by a user of a device from which the request for image data was received.

15. The method of claim 12, wherein the received information relating to a respective location of each of a plurality of vehicles includes information relating to a respective velocity of each of the plurality of vehicles.

16. The method of claim 15, wherein the received information relating to a respective location of each of a plurality of vehicles further includes a time of day at which the respective location and respective velocity of each of the plurality of vehicles is provided.

17. The server of claim 1, wherein the plurality of selectable buttons includes at least one from among a button which relates to accident reporting, a button which relates to a service center, a button which relates to a gas station, a button which relates to a liquefied petroleum gas (LPG) station, a button which relates to cancelling a route, and a button which relates to a detour.

18. The user device of claim 8, wherein the plurality of selectable buttons includes at least one from among a button which relates to accident reporting, a button which relates to a service center, a button which relates to a gas station, a button which relates to a liquefied petroleum gas (LPG) station, a button which relates to cancelling a route, and a button which relates to a detour.

19. The method of claim 12, wherein the plurality of selectable buttons includes at least one from among a button which relates to accident reporting, a button which relates to a service center, a button which relates to a gas station, a button which relates to a liquefied petroleum gas (LPG) station, a button which relates to cancelling a route, and a button which relates to a detour.

\* \* \* \* \*